No. 801,686. PATENTED OCT. 10, 1905.
J. B. PETIT.
ROTARY ENGINE.
APPLICATION FILED JULY 25, 1904.

2 SHEETS—SHEET 1.

Witnesses
Fred H Carl.
Lester W. Garrietson

Inventor
Jean Baptiste Petit
By his Attorney
A. de Bonneville

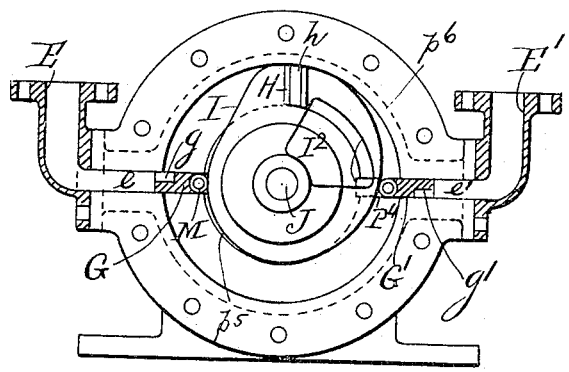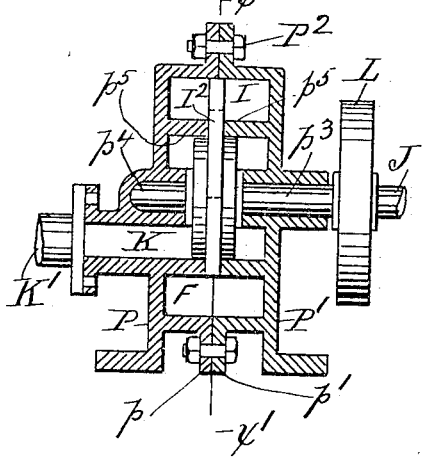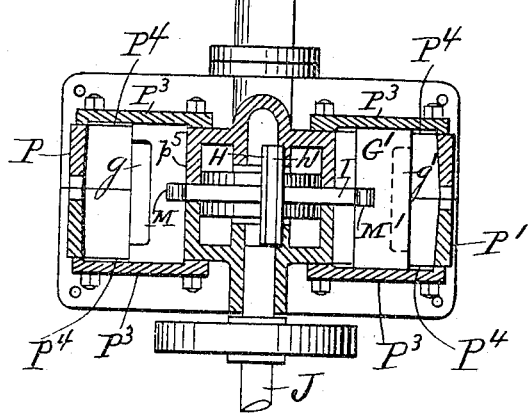

UNITED STATES PATENT OFFICE.

JEAN BAPTISTE PETIT, OF MARSEILLES, FRANCE, ASSIGNOR OF ONE-HALF TO JOSEPH BOTTELBERGHS, OF BROOKLYN, NEW YORK.

ROTARY ENGINE.

No. 801,686.     Specification of Letters Patent.     Patented Oct. 10, 1905.

Application filed July 25, 1904. Serial No. 217,982.

*To all whom it may concern:*

Be it known that I, JEAN BAPTISTE PETIT, a citizen of France, and a resident of Marseilles, in the Province of Bouches du Rhône, France, have invented certain new and useful Improvements in Rotary Engines, of which the following is a specification.

This invention relates to rotary engines; and its object is the production of a rotary engine in which the driving fluid—steam, air, and the like—can be used expansively and in which the friction of the surfaces is reduced to a minimum and the parts of the engine constructed to be easily inspected and repaired.

Figure 1:
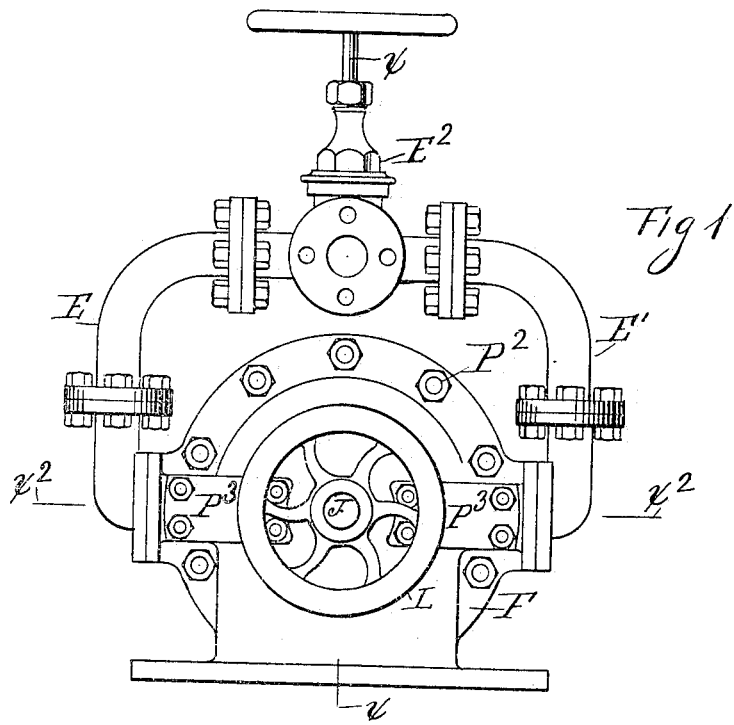
Figure 1A:
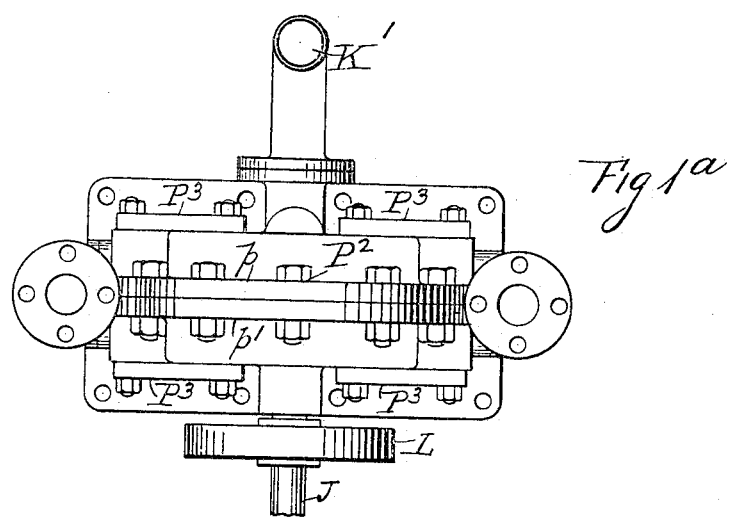

In the drawings, Figure 1 represents a front elevation of the engine. Fig. 1$^a$ shows a top plan view of Fig. 1. Fig. 2 shows a partial section of Fig. 1 on the line $x\,x$. Fig. 3 is a partial section of the engine, as on the line $x'\,x'$ of Fig. 2. Fig. 4 represents a partial section of Fig. 1 on the line $x^2\,x^2$.

The engine consists of the housings P P', which together constitute the cylinder F. Flanges $p\,p'$, extending from the said housings, are bolted together with the bolts P$^2$. Bearings $p^3\,p^4$ in the housings support the engine-shaft J, which latter carries the pulley L. A cam I extends from the shaft J and supports the piston H, which is provided with packing-rings $h\,h'$. The cam operates between the faces of the collars $p^5$, that extend from the housings P', and has the opening I$^2$, by means of which steam can be exhausted from the cylinder on each side of said cam.

Inlet-pipes E E' connect with the ports $e\,e'$, respectively, and are joined with the throttle-valve E$^2$. The ports $e\,e'$ are properly faced to receive and form bearings for the slide-valves G G', respectively. The slide-valves contain cavities $g\,g'$ and carry the rollers M M', which latter are so journaled in apertures made in the slide-valves to avoid leakage.

In the cylinder F is formed the exhaust-cavity K, which leads to the exhaust-pipe K'.

On the faces of the housings are bolted the bonnets P$^3$, so as to cover the sides of the slide-valves G G'. Grooves P$^4$ are formed in said bonnets and grooves $p^6$ in the collars $p^5$ of the housings to form bearings and supports for the valves G G'.

To operate the engine, the driving fluid—steam and the like—enters the pipes E E' by way of the throttle-valve E$^2$ and is then led into the cylinder F through the cavities $g\,g'$ of the slide-valves G G'. The fluid impinges against the piston H and drives the latter. As the piston turns, the cam I bears against the rollers M M' of the slide-valves G G', actuating them to properly admit the driving fluid, the pistons being moved outwardly from the center of the engine by the cam. The pressure of the fluid in the ports $e\,e'$ against the ends of the said slide-valves forces the latter inwardly against the cam I. When the piston passes the cavity K', the exhaust is opened for the escape of the driving fluid through the exhaust-pipe K.

Having described my invention, I claim—

1. In a rotary engine the combination of a cylinder comprising housings, a shaft arranged to rotate therein, a cam extending from the shaft and having an opening leading to both housings, a piston supported on the cam, slide-valves located in ports leading to the cylinder, arranged to bear against the cam and moved inwardly by the driving fluid, and then moved outwardly by the cam.

2. In a rotary engine the combination of a cylinder having inlet and exhaust ports, a shaft supported in bearings in the cylinder, a cam having an opening therethrough extending from the shaft, a piston supported by the cam, slide-valves in the inlet-ports, the said slide-valves having cavities, rollers in the slide-valves arranged to bear against the cam, and grooves in the cylinder supporting said valves.

3. In a rotary engine the combination of housings bolted together, and having grooves in their sides, to form a cylinder, a shaft journaled in the housings, slide-valves with cavities actuated in inlet-ports leading to the cylinder and bearing in said grooves, a cam extending from the shaft and having an opening therethrough, a piston supported by the cam, rollers journaled in the valves and arranged to bear against the cam, and an exhaust-pipe leading from an exhaust-cavity in the cylinder.

Signed at Marseilles, in the Province of Bouches du Rhône, France, this 28th day of June, A. D. 1904.

JEAN BAPTISTE PETIT.

Witnesses:
   HUBERT VIVIEN RIVIÉRE,
   ALLAN MACFARLANE.